United States Patent
Chen

(10) Patent No.: US 6,877,062 B2
(45) Date of Patent: Apr. 5, 2005

(54) METHOD AND APPARATUS FOR INCREASING THE MEMORY READ/WRITE SPEED BY USING INTERNAL REGISTERS

(75) Inventor: Chih-Yung Chen, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 354 days.

(21) Appl. No.: 10/265,744

(22) Filed: Oct. 8, 2002

(65) Prior Publication Data

US 2003/0120854 A1 Jun. 26, 2003

(30) Foreign Application Priority Data

Dec. 24, 2001 (TW) .......................................... 90131964 A

(51) Int. Cl.[7] .............................................. G06F 12/00
(52) U.S. Cl. ...................................................... 711/2
(58) Field of Search ....................................... 711/2, 202

(56) References Cited

U.S. PATENT DOCUMENTS 5,237,699 A * 8/1993 Little et al. .................... 714/23
5,515,540 A * 5/1996 Grider et al. ................. 713/200
5,734,857 A * 3/1998 Gaubatz ........................ 711/2

* cited by examiner

Primary Examiner—Hiep T. Nguyen
(74) Attorney, Agent, or Firm—Rabin & Berdo, P.C.

(57) ABSTRACT

The present invention is a method and apparatus for increasing the memory read/write speed with special function registers (SFRs). This method comprises the steps of: (1) connecting additional external memory to the processor as expanded memory, (2) mapping the address of expanded memory to the unused SFR address in the processor, and (3) creating a control flag for switching the processor between the ICE mode or the normal mode. When in the ICE mode, the processor still uses extended instructions to perform read/write with expanded memory. Switching back to the normal mode, the processor can use the internal instructions to perform read/write with expanded memory. Using this method, built-in of an internal ICE and the slowing down of read/write during debugging due to the use of an external ICE can be eliminated.

7 Claims, 5 Drawing Sheets

| Addr |   |   |   |   |   |   |   |   | Addr |
|------|-------|------|--------|--------|-----|-----|---|------|------|
| F8H  |       |      |        |        |     |     |   |      | FFH  |
| F0H  | B     |      |        |        |     |     |   |      | F7H  |
| E8H  |       |      |        |        |     |     |   |      | EFH  |
| E0H  | ACC   |      |        |        |     |     |   |      | E7H  |
| D8H  |       |      |        |        |     |     |   |      | DFH  |
| D0H  | PSW   |      |        |        |     |     |   |      | D7H  |
| C8H  | T2CON |      | RCAP2L | RCAP2H | TL2 | TH2 |   |      | CFH  |
| C0H  |       |      |        |        |     |     |   |      | C7H  |
| B8H  | IP    |      |        |        |     |     |   |      | BFH  |
| B0H  | P3    |      |        |        |     |     |   |      | B7H  |
| A8H  | IE    |      |        |        |     |     |   |      | AFH  |
| A0H  | P2    |      |        |        |     |     |   |      | A7H  |
| 98H  | SCON  | SBUF |        |        |     |     |   |      | 9FH  |
| 90H  | P1    |      |        |        |     |     |   |      | 97H  |
| 88H  | TCON  | TMOD | TL0    | TL1    | TH0 | TH1 |   |      | 8FH  |
| 80H  | P0    | SP   | DPL    | DPH    |     |     |   | PCON | 87H  |

FIG.1

METHOD AND APPARATUS FOR INCREASING THE MEMORY READ/WRITE SPEED BY USING INTERNAL REGISTERS

BACKGROUND OF THE INVENTION

1. Field of the Invention

The present invention relates to a method and apparatus for increasing the memory read/write speed by using special function registers (SFR) in the processor. With this method, built-in of an internal ICE and the slowing down of read/write operation during debugging due to the use of an external ICE can be eliminated.

2. Description of Related Arts

The role of the SFR in the 8051 single-chip processor is vitally important. The SFR is a 128-byte region in the memory that can be directly addressed by internal registers. The register address in the range 80H~FFH is for saving the control status and data of various special functions and peripherals, for example, break points, serial ports, clock/timer, etc. All these control registers and data must first be set in the SFR according to their predetermined values.

To test and debug the functions of a new product using the registers in the SFR in the product development stage, the developer often has to built-in an internal ICE in the product. However, the preparation of an internal ICE often requires considerable human and material resources to develop the related software, firmware and hardware. Among the methods that can reduce the resource commitment, the idea of an extended memory instruction (using MOVX) seems to be viable. The debug program employs an 8051 processor that supports the ICE operation mode. Its internal registers are disabled and the pins for PORT0, PORT2, ALE, PSEN, RESET, and CLK are connected to the corresponding pins on an external ICE in the debugging operation. Though debugging can be accomplished using this method with no internal ICE and the commitment of resources can be reduced, the read/write performance is quite poor.

The poor read/write performance is mainly due to the longer machine cycle required for execution of an extended read/write instruction as compared with an internal instruction. In the normal mode, reading from or writing to the internal registers only requires an internal instruction (MOV) with one machine cycle; whereas the equivalent read/write operation with extended memory instruction (using MOVX) needs two machine cycles. Also, during the execution of an MOVX instruction, an accumulator (ACC) is needed for address computation before writing back to the original register, thereby slowing down the read/write speed. Furthermore, if a read/write operation is performed on other registers (for Ri or DPTR), their addresses have to be assigned before using them. The program size is therefore quite large. These extended read/write instructions cannot meet the fast read/write requirement.

The present invention provides a debugging method that is easy to use on a processor and still maintains satisfactory read/write performance.

SUMMARY OF THE INVENTION

The main object of the present invention is to provide a method for increasing the read/write speed of a processor. The method is accomplished by (1) adding memory to the processor as expanded memory, (2) using the memory mapping technique to map the address of expanded memory to the unused SFR address in the processor, and (3) using a control flag to switch the processor between the ICE mode and the normal mode. Under the ICE mode, the processor uses an MOVX instruction to perform expanded memory read/write; whereas in the normal mode, the processor uses an MOV instruction to perform read/write with functional registers.

The use of expanded memory previously described facilitates the use of an external ICE for debugging. Through memory mapping to emulate internal registers, the processor is able to use an MOV instruction to perform read/write on the expanded memory under the normal mode, thereby speeding up the read/write operation with a shorter machine cycle. The previous support for an internal ICE can be done away with.

Expanded memory can be accessed through byte and block mode address mapping to the unused SFR addresses.

The read/write instructions for both the ICE mode and normal mode are carried out by a set of macro instructions, saved in their respective files for direct program calls, therefore preventing erroneous read data.

The present invention provides a method and apparatus for increasing the memory read/write speed with SFRs in the processor, wherein the apparatus comprises a processor, a memory block, switching means, a decoding unit and a latch.

A processor has one or more I/O ports for extended instructions and an I/O port for internal instructions.

A memory block is emulate as internal memory.

A first switching means, located between the processor and memory, selects the output instruction channel from the processor to the memory, switching between the extended instruction and internal instruction mode.

A second switching means selects the appropriate data pins on the memory for connection to the extended instruction port or internal instruction port when the instruction mode is switched.

A decoding unit with two input terminals respectively connected to the extended instruction port and the internal instruction port of the processor, is used to determine whether the processor output is an extended instruction or an internal instruction. An output terminal is connected to the select pins of the first and second switching means to control the switching of the first and second switching device in accordance with the extended instruction or internal instruction.

A latch, located between the first switching means and the memory.

The features and structure of the present invention will be more clearly understood when taken in conjunction with the accompanying figures.

BRIEF DESCRIPTION OF THE DRAWINGS

FIG. 1 is an address allocation map of the special function registers;

DETAILED DESCRIPTION OF THE PREFERRED EMBODIMENT

The present invention provides a method for increasing the memory read/write speed of a processor. The first step is to connect the processor to an expanded memory, where an 8051 processor is used in the present embodiment. The second step is to use the memory mapping technique to map the address of expanded memory to the unused addresses of an internal SFR, such that the expanded memory can be treated as internal registers by the processor by emulation.

With reference to FIG. 1, SFR is a memory block of 128 bytes (80H~FFH) that are directly addressable. Besides a number of internal registers already existing in the processor, the unused SFR address space is utilized by the present invention for mapping the address of expanded memory. Under such memory arrangement, the expanded memory can be used to emulate the internal registers in the normal mode, thereby allowing the internal instructions to perform functional register read/write. Compared with the read/write operations on the external memory by extended instructions, the performance of the processor can be enhanced considerably.

The third step is to make use of a control flag to switch the processor between the ICE mode and the normal mode.

Figure 2:
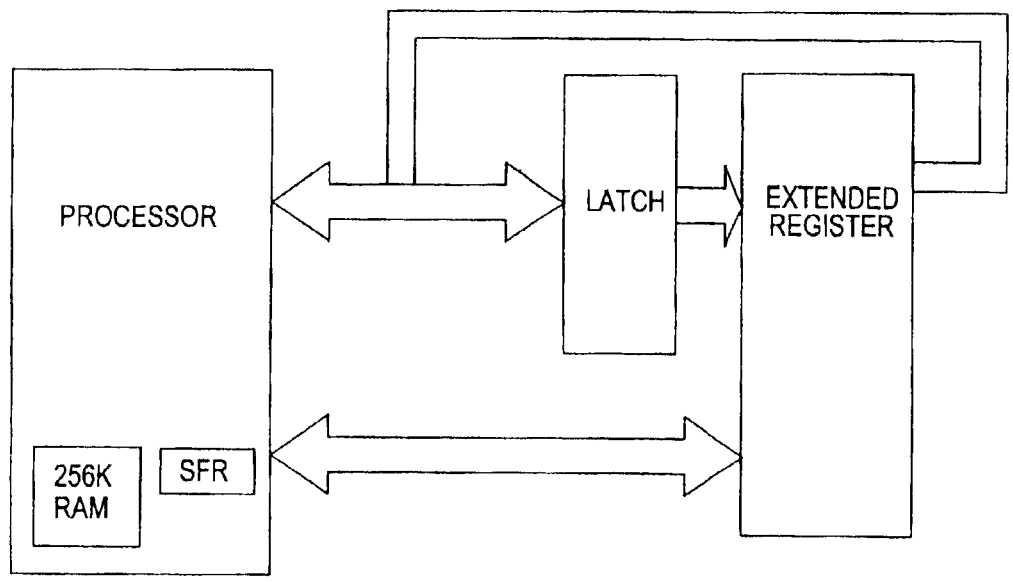
FIG. 2 is a block diagram of the functional layout of the functional registers in relation to the processor in the ICE mode in accordance with the present invention.

When in the ICE mode, the processor uses the extended instructions (MOVX) to read/write the expanded memory. The working relation between the processor, latch and functional registers under the ICE mode is depicted in FIG. 2. The present design facilitates the connection to an external ICE for debugging.

Figure 3:
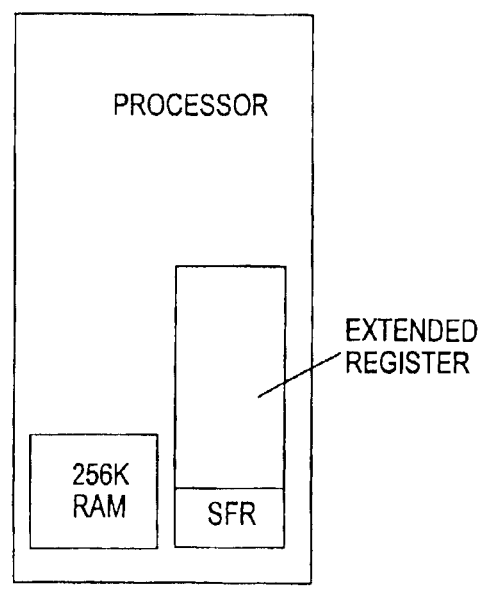
FIG. 3 is a block diagram of the functional layout of the functional registers in relation to the processor in the normal mode.

The working relation between the processor and expanded memory under the normal mode is depicted in FIG. 3. When the processor is switched back to the normal mode, the processor treats the functional registers as internal registers through the memory mapping technique. executing the internal instructions (MOV) to perform read/write with functional registers. Since an internal instruction has a shorter machine cycle than an extended instruction, the speed of processor read/write can be improved.

In the implementation phase, the instructions for both the ICE mode and normal mode are carried out through a set of macros, which are respectively saved in individual files. An instruction can be executed by directly invoking the corresponding macro file, therefore preventing erroneous data read.

Figure 4:
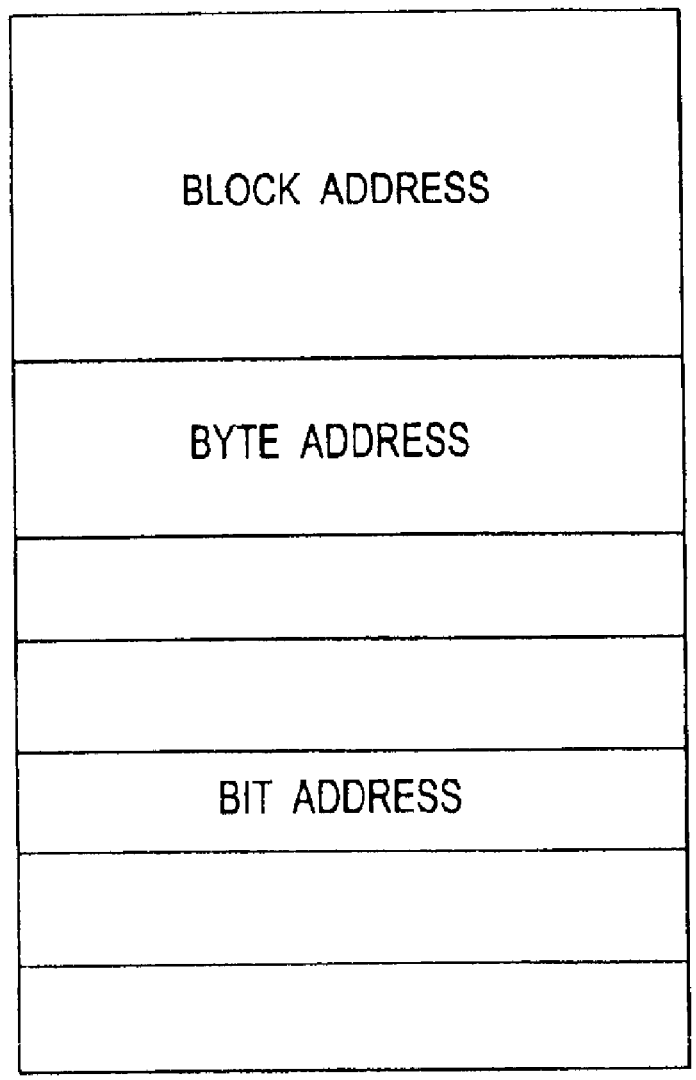
FIG. 4 is a memory allocation map for different registers in expanded memory.

With reference to FIG. 1, since the existing registers of the processor are irregularly distributed in the SFR, the unused spots in bytes or bits can be defined as block type, byte type or bit type address for functional registers. The general memory allocation for block address, byte address and bit address in expanded memory is shown in FIG. 4. These addressing schemes are then used to map the address of functional registers to the unused SFR address in the processor.

Figure 5:
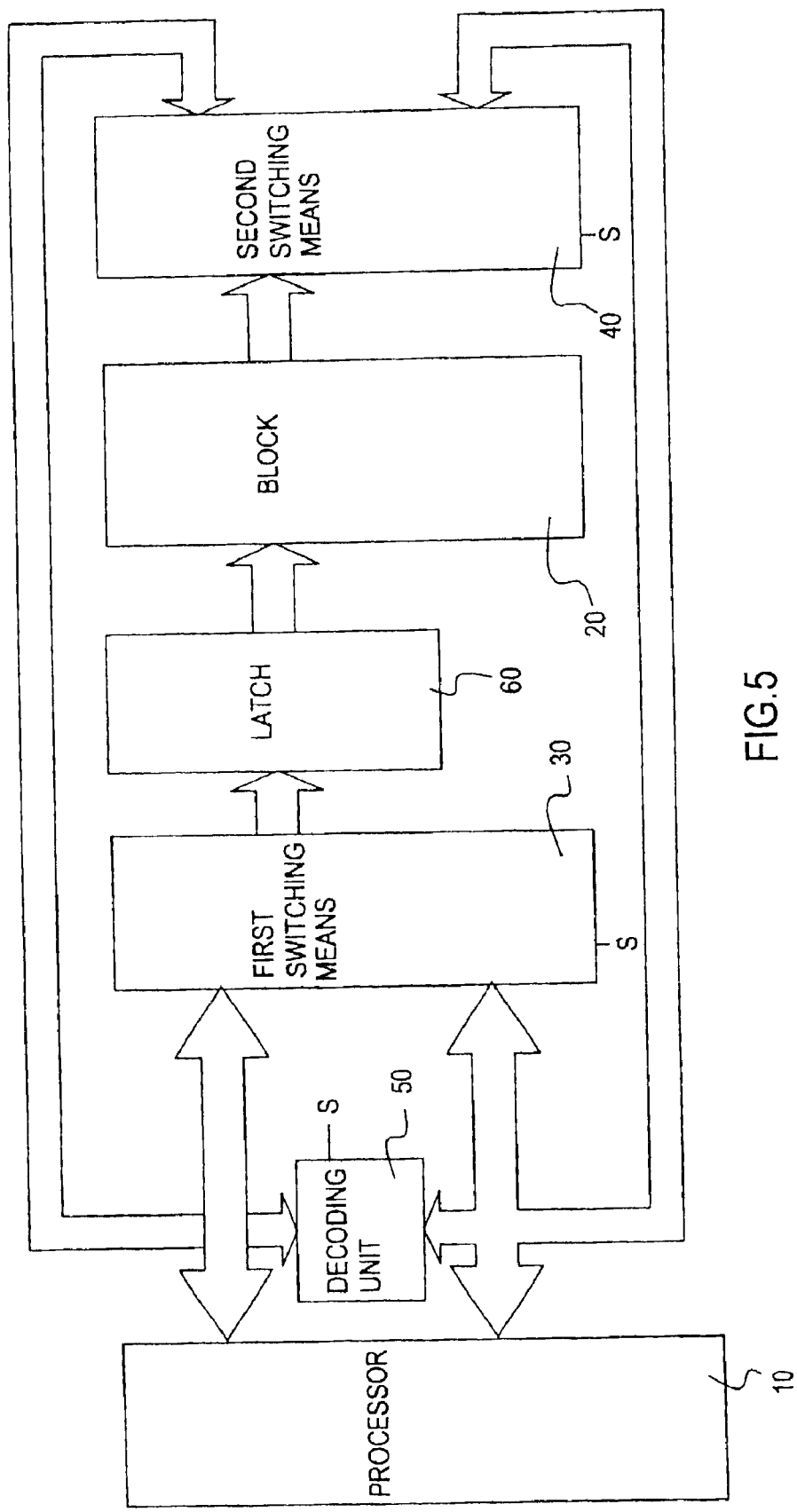
FIG. 5 is a block diagram of the apparatus to implement the method for increasing the read/write speed of a processor in accordance with the present invention.

The use of functional registers in the expanded memory facilitates the connection of an external ICE for debugging. Through the memory mapping process functional registers are capable of emulating the internal registers in the normal mode. The processor then issues internal instructions to perform read/write, therefore reducing the machine cycle and improving the read/write performance. With reference to FIG. 5, the apparatus for performing the read/write operation described above comprises a processor (10), a memory block (20), a first switching means (30), a second switching means (40), a decoding unit (50) and a latch (60).

The processor (10) is equipped with one or more I/O ports for extended instructions and an I/O port for internal instructions. The memory block (20) is used to emulate the internal memory of the processor (10). The first switching means (30) is located between the processor (10) and the memory (20) and determine whether the internal instructions or external instructions to be sent to the memory. The second switching means (40) selects the appropriate data pins on the memory (20) for connection to the extended instruction port or internal instruction port when the instruction mode is switched. The decoding unit (50) which has two input terminals and an output terminal, wherein the two input terminals are respectively connected to the extended instruction port and internal instruction port of the processor (10) to determine whether the processor output is an internal instruction or extended instruction. The output terminal is connected to the select pins of the first and second switching means (30, 40) to control the switching of the first and second switching means for outputting either the internal instruction or extended instruction. The latch (60), located between the first switching means (30) and the memory (20), assigns the memory address for register read/write.

Figure 6:
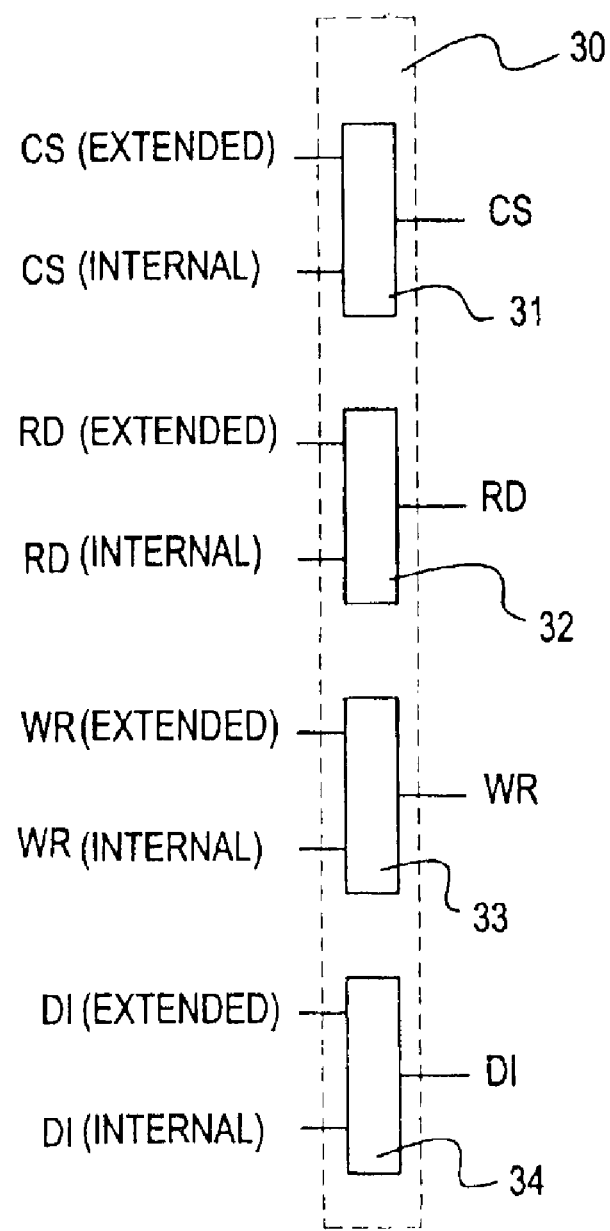
FIG. 6 is a block diagram of the first switching means.

The first and second switching means (30, 40) can be formed by one or more multiplexers. With reference to FIG. 6, the first switching means (30) is formed by multiple multiplexers (31~34) to select the respective output pin on the processor. The first multiplexer (31) selects the CS pin switching between the internal instruction or extended instruction modes. The second multiplexer (32) selects the RD output pin. The third multiplexer (33) selects the WR pin. The fourth multiplexer (34) selects the DI output pin. The switching of the multiplexers (31~34) is controlled by the decoding unit (50) through the status change on the select (S) pin.

Under the ICE mode, the processor (10) outputs extended instructions through the extended instruction port to the first switching means (30) and the decoding unit (50) for switching the first and second switching means (30, 40) to process the extended instruction. The extended instruction (MOVX) is thereby output through the first switching means (30) to the memory (20). The processor proceeds to read data from the memory (20). The data read from the memory (20) is then returned by way of the second switching means (40) to the processor (10) through the extended instruction port.

Under the normal mode, the processor (10) outputs internal instructions through the internal instruction port to the first switching means (30) and the decoding unit (50). This output instruction is distinguished by the first and second switching means (30, 40) that then switch to the internal instruction. The internal instruction (MOV) is thereby output through the first switching means (30) to the memory (20). The processor proceeds to read data from the memory (20) at the address. The data read from the memory (20) is then returned by way of the second switching means (40) and the internal instruction port to the processor (10).

By means of the design of the method and the apparatus, the processor operation can be switched between the ICE mode and the normal mode. The ICE mode is used for debugging with an external ICE, such that the extended instruction output from the processor can be processed and analyzed by the external ICE. No internal ICE is necessary for debugging or other ICE related functions.

Under the normal mode, the addresses in functional registers are mapped to the SFR region in the processor to emulate the operation of internal registers. The processor is then able to execute internal instructions to perform read/ write with functional registers. Since an internal instruction requires a shorter machine cycle than an extended instruction, the read/write performance can be improved considerably.

The method and apparatus have overcome the need to built-in internal ICE for debugging a product and have made notable improvements over the conventional methods in terms of resource utilization and progressive technology.

The foregoing description of the preferred embodiment of the present invention is intended to be illustrative only and, under no circumstances, should the scope of the present invention be so restricted.

What is claimed is:

1. A method for increasing the memory read/write speed by using internal Special Function Registers (SFRs), comprising the steps of:

adding a memory to a processor as expanded memory;

mapping the expanded memory to unused SFR addresses of the processor;

using switching means to control the switching between the first and second modes, wherein the processor in the first mode uses extended instructions to perform read/write with the expanded memory; but in the second mode through memory mapping it can use internal instructions to perform read/write with the expanded memory.

2. A method for increasing the memory read/write speed by using internal SFRs as claimed in claim 1, wherein the expanded memory address can be defined in a type selected from the block type, byte type, or bit type mapping to the unused SFR address in the processor.

3. A method for increasing the memory read/write speed by using internal SFRs as claimed in claim 1, wherein the instructions for both the first mode and second mode are executed by a set of macros stored in separate files.

4. A method for increasing the memory read/write speed by using internal SFRs as claimed in claim 1, wherein the processor makes use of a control flag for switching between the first and second mode.

5. An apparatus for increasing he memory read/write speed, the apparatus comprises:

a processor having one or more extended instruction ports and one internal instruction port;

a memory block defined to multiple registers;

switching means located between the processor and the memory block, used to select either extended instruction or internal instruction mode; and a decoding unit, wherein the inputs are respectively connected to the internal instruction port and the one or more extended instruction ports of the processor, the output is connected to the selected pins of the switching means, and the decoding unit is used to determine whether the current operation is an internal or an extended instruction.

6. An apparatus for increasing the memory read/write speed as claimed in claim 5, wherein the switching means is formed by one or more multiplexers for selecting the appropriate output pins on the processor when the instruction mode is switched.

7. An apparatus for increasing the memory read/write speed as claimed in claim 5, wherein the apparatus further includes a latch located between the switching means and the memory.

* * * * *